US012694678B2

(12) United States Patent
Lee et al.

(10) Patent No.:  US 12,694,678 B2
(45) Date of Patent:      Jul. 28, 2026

(54) IMAGE-BASED ABNORMAL EVENT DETECTION

(71) Applicant: ObjectVideo Labs, LLC, Tysons, VA (US)

(72) Inventors: Jangwon Lee, Tysons, VA (US); Gang Qian, McLean, VA (US); Allison Beach, Leesburg, VA (US); Donald Gerard Madden, Columbia, MD (US)

(73) Assignee: ObjectVideo Labs, LLC, Tysons, VA (US)

( * ) Notice: Subject to any disclaimer, the term of this patent is extended or adjusted under 35 U.S.C. 154(b) by 187 days.

(21) Appl. No.: 18/401,834

(22) Filed: Jan. 2, 2024

(65) Prior Publication Data

US 2024/0161504 A1      May 16, 2024

Related U.S. Application Data

(63) Continuation of application No. 17/104,329, filed on Nov. 25, 2020, now Pat. No. 11,900,679.

(60) Provisional application No. 62/940,431, filed on Nov. 26, 2019.

(51) Int. Cl.
| | |
|---|---|
| *G06V 20/40* | (2022.01) |
| *G06F 18/22* | (2023.01) |
| *G06V 10/44* | (2022.01) |
| *G06V 10/74* | (2022.01) |
| *G06V 10/764* | (2022.01) |
| *G06V 10/776* | (2022.01) |
| *G06V 20/52* | (2022.01) |

(52) U.S. Cl.
CPC .............. *G06V 20/46* (2022.01); *G06F 18/22* (2023.01); *G06V 10/454* (2022.01); *G06V 10/761* (2022.01); *G06V 10/764* (2022.01); *G06V 10/776* (2022.01); *G06V 20/41* (2022.01); *G06V 20/52* (2022.01); *G06V 20/44* (2022.01)

(58) Field of Classification Search
CPC .... G06V 20/46; G06V 10/454; G06V 10/761; G06V 10/764; G06V 10/776; G06V 20/41; G06V 20/52; G06V 20/44; G06F 18/22
See application file for complete search history.

(56) References Cited

U.S. PATENT DOCUMENTS

| | | | |
|---|---|---|---|
| 10,007,849 B2 | 6/2018 | Bataller et al. | |
| 10,867,398 B2 | 12/2020 | Leduc | |
| 10,897,659 B2 | 1/2021 | Lokshin et al. | |
| (Continued) | | | |

*Primary Examiner* — Amara Abdi
(74) *Attorney, Agent, or Firm* — Fish & Richardson P.C.

(57) ABSTRACT

Methods and systems for image-based abnormal event detection are disclosed. An example method includes obtaining a sequential set of images captured by a camera; generating a set of observed features for each of the images; generating a set of predicted features based on a portion of the sets of observed features that excludes the set of observed features for a last image in the sequential set of images; determining that a difference between the set of predicted features and the set of observed features for the last image in the sequential set of images satisfies abnormal event criteria; and in response to determining that the difference between the set of predicted features and the set of observed features for the last image in the sequential set of images satisfies abnormal event criteria, classifying the set of sequential images as showing an abnormal event.

20 Claims, 5 Drawing Sheets

(56) References Cited

U.S. PATENT DOCUMENTS

| 11,409,304 | B1 | 8/2022 | Cai et al. | |
| 12,358,010 | B2 * | 7/2025 | Wilcox | B05B 12/081 |
| 2016/0307070 | A1 | 10/2016 | Jiang et al. | |
| 2017/0024617 | A1 * | 1/2017 | Yamaguchi | G01C 21/28 |
| 2017/0186169 | A1 * | 6/2017 | Viswanath | G06T 7/579 |
| 2018/0067605 | A1 * | 3/2018 | Lin | G06F 3/0416 |
| 2018/0236937 | A1 * | 8/2018 | Utter | G01S 19/53 |
| 2019/0205651 | A1 | 7/2019 | Chang et al. | |
| 2019/0371142 | A1 * | 12/2019 | Carter | G08B 13/19669 |
| 2020/0349241 | A1 | 11/2020 | Shapiro et al. | |
| 2021/0042509 | A1 * | 2/2021 | Valiulla | G06N 20/00 |
| 2021/0158048 | A1 | 5/2021 | Lee et al. | |
| 2021/0333798 | A1 * | 10/2021 | Kato | G05D 1/0276 |
| 2022/0156137 | A1 * | 5/2022 | Yoshida | G05B 23/02 |

* cited by examiner

400

OBTAINING A SEQUENTIAL SET OF IMAGES CAPTURED
BY A CAMERA                                                                    402

GENERATING A SET OF OBSERVED FEATURES FOR EACH OF
THE IMAGES                                                                     404

GENERATING A SET OF PREDICTED FEATURES BASED ON A PORTION
OF THE SETS OF OBSERVED FEATURES THAT EXCLUDES THE SET OF
OBSERVED FEATURES FOR A LAST IMAGE IN THE SEQUENTIAL
SET OF IMAGES                                                                  406

DETERMINING THAT A DIFFERENCE BETWEEN THE SET OF PREDICTED
FEATURES AND THE SET OF OBSERVED FEATURES FOR THE LAST
IMAGE IN THE SEQUENTIAL SET OF IMAGES SATISFIES
ABNORMAL EVENT CRITERIA                                                        408

IN RESPONSE TO DETERMINING THAT THE DIFFERENCE BETWEEN THE
SET OF PREDICTED FEATURES AND THE SET OF OBSERVED FEATURES
FOR THE LAST IMAGE IN THE SEQUENTIAL SET OF IMAGES SATISFIES
ABNORMAL EVENT CRITERIA, CLASSIFYING THE SET OF
SEQUENTIAL IMAGES AS SHOWING AN ABNORMAL EVENT          410

FIG. 4

IMAGE-BASED ABNORMAL EVENT DETECTION

CROSS-REFERENCE TO RELATED APPLICATION

This application is a continuation of U.S. application Ser. No. 17/104,329, filed Nov. 25, 2020, now allowed, which claims the benefit of U.S. Provisional Application No. 62/940,431, filed Nov. 26, 2019, and titled "Image-Based Abnormal Event Detection." The disclosure of each of the foregoing applications is incorporated herein by reference.

TECHNICAL FIELD

This disclosure application relates generally to surveillance cameras.

BACKGROUND

Many properties are equipped with monitoring systems that include sensors and connected system components. Some property monitoring systems include cameras.

SUMMARY

Techniques are described for image-based abnormal event detection.

Many residents and homeowners equip their properties with monitoring systems to enhance the security, safety, or convenience of their properties. A property monitoring system can include cameras that can obtain visual images of scenes at the property. A camera can detect objects of interest and track object movement within a field of view. Objects of interest can include, for example, humans, vehicles, and animals. Objects of interest may be moving or stationary. The presence or movement of on object can be considered an event.

In some examples, events detected by a camera can trigger a property monitoring system to perform one or more actions. For example, detections of events that meet pre-programmed criteria may trigger the property monitoring system to send a notification to a resident of the property or to adjust a setting of the property monitoring system. It is desirable that a camera accurately detect and classify events in order to send valid notifications to the residents. Specifically, it is desirable to differentiate between normal and abnormal events.

Abnormal events can be defined as events that are different from expected events based on past observations. Abnormal events can be, for example, an unknown person approaching a property, an unfamiliar vehicle parked near a property, a person in an unusual location, or a vehicle traveling in an unexpected direction. Abnormal events occur less frequently than normal events.

A camera or other component of a monitoring system can use a machine deep learning model to identify abnormal events. The machine learning model can be trained using images from normal events. The trained machine learning model can detect abnormal events by forecasting future features, given observed features for a set of normal events.

The machine learning model can detect abnormal events that include various types of anomalies, such as behavior anomalies, spatial anomalies, and temporal anomalies. An example behavior anomaly is a vehicle entering a one-way street, traveling in the wrong direction. An example spatial anomaly is a person standing in the middle of a roadway. An example temporal anomaly is a person approaching a property late at night.

Image-based abnormal event detection can improve the accuracy and relevance of notifications generated by cameras. For example, image-based abnormal event detection can be used to identify normal events, and to suppress notifications that might otherwise be generated based on the normal events. In this way, false alarm notifications can be reduced.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 4 is a flow diagram of an example process for image-based abnormal event detection.

Like reference numbers and designations in the various drawings indicate like elements.

DETAILED DESCRIPTION

Figure 1:
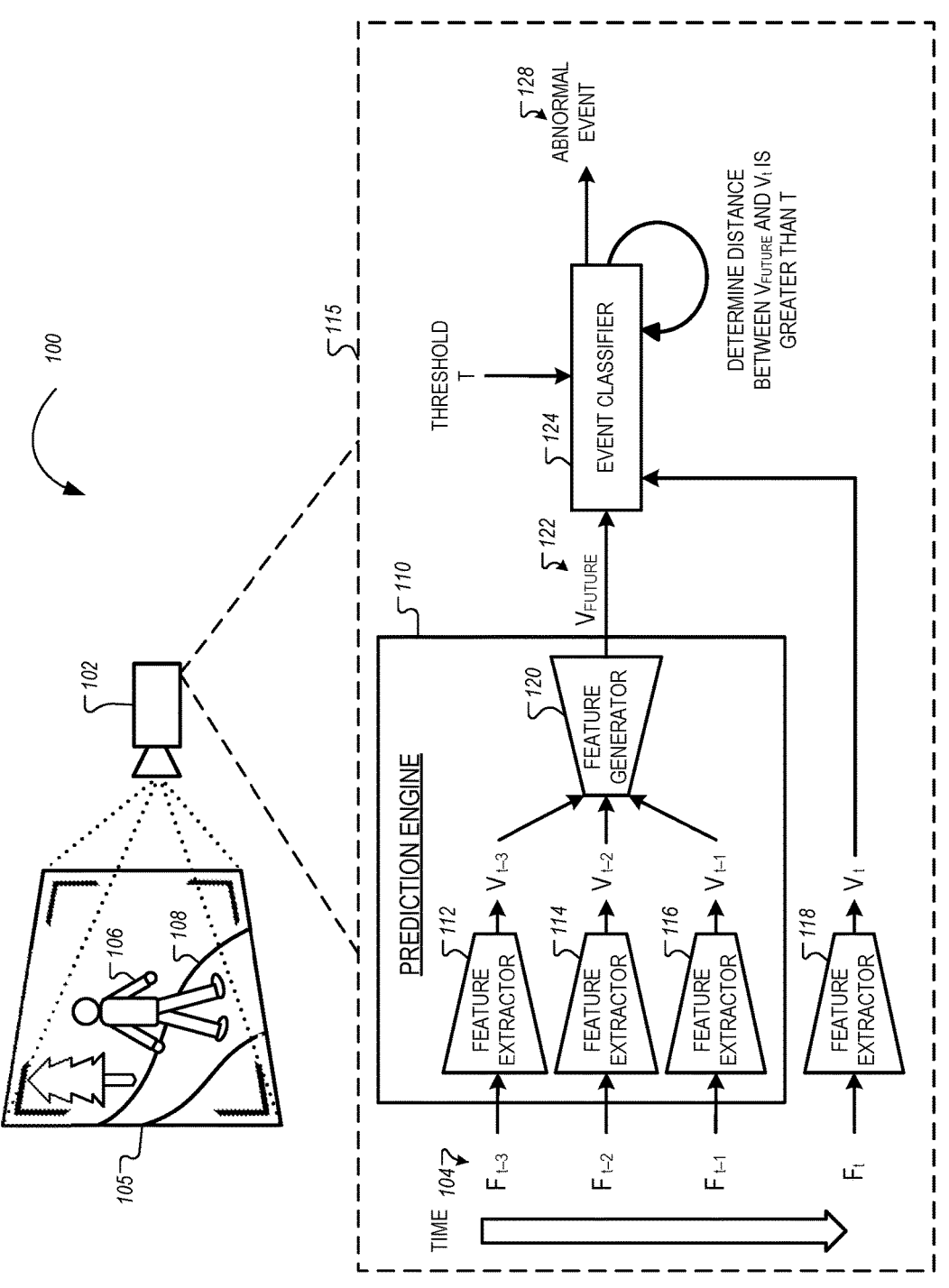
FIG. 1 illustrates an example system for image-based abnormal event detection.

FIG. 1 illustrates an example system 100 for image-based abnormal event detection. The system 100 includes a camera 102 that captures video 105. The video 105 includes multiple image frames 104 captured over time. For example, the image frames 104 include frame $F_{t-3}$ captured at time t–3, frame $F_{t-2}$ captured at time t–2, frame $F_{t-1}$ captured at time t–1, and frame F captured at time t. The image frames 104 of the video 105 show an outdoor scene of a person 106 walking on a path 108, approaching the camera 102.

The camera 102 can perform video analysis on the video 105. Video analysis can include detecting, identifying, and tracking objects of interest in the video 105. Video analysis can also include determining if image frames 104 of the video 105 represent an abnormal event 128. To determine if the image frames 104 of the video 105 represent an abnormal event 128, the camera 102 can include an abnormal event detector 115. The abnormal event detector 115 includes a prediction engine 110 and an event classifier 124.

To determine if the video 105 represents an abnormal event 128, the camera 102 compares predicted image features with observed image features. When observed image features differ from predicted image features by more than a threshold T, the camera 102 can determine that image frames 104 of the video 105 indicate an abnormal event.

The camera 102 includes a prediction engine 110. The prediction engine 110 can predict features of future image frames based on observations of past image frames. The prediction engine 110 includes feature extractors 112, 114, 116, and feature generator 120. The prediction engine 110 receives image frames 104, extracts features from the images frames 104, and generates a future feature vector $V_{future}$ that predicts features of a subsequent image frame of the video 105.

For example, the prediction engine 110 receives the image frames $F_{t-3}$, $F_{t-2}$, $F_{t-1}$. The feature extractor 112 extracts features from the image frame $F_{t-3}$ The feature extractor 114 extracts features from the image frame $F_{t-2}$ The feature extractor 116 extracts features from the image frame $F_{t-1}$.

The feature extractors 112, 114, 116 can extract features from the image frames 104, for example, using one or more algorithms that identify characteristics of the image frames 104. The feature extractors 112, 114, 116 can identify attributes of object features in multiple dimensions. For example, the feature extractors 112, 114, 116 can identify colors, textures, and shapes within the image frames 104. Additional features can include object positions, object edges, and boundaries between regions of the image frames 104.

The feature extractors 112, 114, 116 output feature vectors $V_{t-3}$, $V_{t-2}$, $V_{t-1}$, respectively. Each feature vector $V_{t-3}$, $V_{t-2}$, $V_{t-1}$ includes data representing features of the image frames $F_{t-3}$, $F_{t-2}$, $F_{t-1}$, respectively. Example features of each image frame $F_{t-3}$, $F_{t-2}$, $F_{t-1}$ of the video 105 can represent a position of the person 106 on the path 108. The feature vector $V_{t-3}$ may include data representing the person 106 in the center of the path 108 at a certain distance from the camera 102. The feature vector $V_{t-2}$ may include data representing the person 106 in the center of the path 108 at a closer distance from the camera 102. The feature vector $V_{t-1}$ may include data representing the person 106 in the center of the path 108 at an even closer distance from the camera 102.

The feature generator 120 receives the feature vectors $V_{t-3}$, $V_{t-2}$, $V_{t-1}$. The feature generator 120 can be a neural network model, e.g., a convolutional neural network (CNN) model. The feature generator 120 can be trained using a machine deep learning method. A training process for the feature generator 120 is described in greater detail with reference to FIG. 2.

Based on the feature vectors $V_{t-3}$, $V_{t-2}$, $V_{t-1}$, the feature generator 120 outputs the future feature vector $V_{future}$. The future feature vector $V_{future}$ includes data representing features of a predicted feature vector for a subsequent image frame, e.g., the image frame $F_t$. In some examples, the future feature vector $V_{future}$ can include a multimodal distribution of future scene features. An example feature of the future feature vector $V_{future}$ can include an expected position of the person 106 in relation to the path 108 and a distance from the camera 102.

The feature extractor 118 extracts features from the image frame $F_t$. In some examples, the image frame $F_t$ is the current, or most recent, observed frame of the video 105. The feature extractor 118 outputs the observed feature vector $V_t$. The observed feature vector $V_t$ includes data representing features of the image frame $F_t$. For example, a feature of the observed feature vector $V_t$ can include an actual position of the person 106 in relation to the path 108 and a distance from the camera 102.

The event classifier 124 compares predicted image frame features to actual image frame features to determine if the image frames 104 of the video 105 represent an abnormal event 128. The event classifier 124 receives the future feature vector $V_{future}$ and the observed feature vector $V_t$. The event classifier 124 determines a distance between the future feature vector $V_{future}$ and the observed feature vector $V_t$.

The event classifier 124 also receives a threshold T. The threshold T is a distance between $V_{future}$ and $V_t$ that represents an abnormal event. In some examples, the threshold T can be manually set. In some examples, the threshold T can be a learned value, e.g., through a machine deep learning process. The abnormal event detector 115 can determine the threshold T, for example, by training on many example image frames that represent normal events.

The threshold T can vary depending on specific installations of the camera 102. For example, a camera positioned outdoors may have a larger threshold T for tracking object paths than a camera positioned in an indoor hallway. The camera positioned outdoors may capture images of objects moving in varied paths, e.g., toward and away from the camera, and across the field of view from left to right or at a diagonal. The camera positioned outdoors may also capture images of various types of objects, e.g., people, vehicles, and animals. In contrast, the camera positioned in an indoor hallway may typically capture images of objects moving in orderly patterns, e.g., up and down the hallway. Thus, the camera positioned outdoors may have a larger threshold T for tracking object paths than a camera positioned in an indoor hallway, in order to mitigate the occurrence of false alarms caused by the varied outdoor paths.

In some examples, the threshold T can adjust over time. For example, the threshold T may be set to an initial default value. Over time, the abnormal event detector 115 trains on example image frames that represent normal events. The threshold T can then adjust to more accurately differentiate between normal and abnormal events, e.g., by increasing or decreasing. Additionally, as the feature generator 120 trains on normal events, the feature generator 120 can become more accurate over time. The threshold T can then adjust to a smaller value to improve detection of abnormal events.

The event classifier 124 compares the distance between $V_{future}$ and $V_t$ to the threshold T. For example, the distance between $V_{future}$ and $V_t$ can include a difference between an actual observed position of the person 106 in the image frame $F_t$, and the predicted position of the person 106 from the future observed feature vector $V_t$. The threshold T may be, for example, a threshold distance between predicted and actual position that represents an abnormal event. If the event classifier 124 determines that the distance between $V_{future}$ and $V_t$ is greater than the threshold T, the event classifier 124 outputs an indication of an abnormal event 128. For example, if the person 106 steps off of the path 108, the distance between $V_{future}$ and $V_t$ may be greater than the threshold T. The event classifier 124 then outputs an indication of the abnormal event 128, e.g., the person 106 stepping off of the path 108.

In some examples, the abnormal event detector 115 can detect for abnormal events related to certain features, while ignoring other features. For example, the camera 102 may perform object recognition and/or facial recognition on objects of interest. The camera 102 may differentiate between familiar objects and unfamiliar objects. Familiar objects can include residents of a property and vehicles that commonly park at the property. Unfamiliar objects can include unknown people and vehicles. The camera 102 can differentiate between familiar and unfamiliar objects, e.g., by comparing features extracted by the feature extractors 112, 114, 116 to known features of familiar residents, vehicles, etc.

To focus on unfamiliar features, the abnormal event detector 115 may filter out familiar features from extracted by the feature extractors 112, 114, 116. The abnormal event detector 115 can filter out the familiar features so that the familiar features are not provided to the feature generator 120. Additionally, the abnormal event detector 115 can filter out the familiar features extracted by the feature extractor 118, so that the familiar features are not included in the observed feature vector $V_t$.

When the camera 102 detects an unfamiliar object, e.g., an unknown person, the abnormal event detector 115 may focus on detecting appearance abnormalities. For example, the abnormal event detector 115 can monitor the unknown person to observe if the unknown person is carrying a weapon or disguising his or her face. In contrast, when the camera 102 recognizes a familiar object, e.g., a familiar person, the abnormal event detector 115 may ignore appearance abnormalities. The abnormal event detector 115 can instead focus on detecting behavioral abnormalities. For example, the abnormal event detector 115 can monitor the familiar person for abnormal behaviors such as waiting outside for an extended period of time, e.g., if the familiar person is locked out of the property.

A time frame for abnormal event detection can be any appropriate time frame. For example, the time frame can be less than one second, several seconds, several minutes, several hours, or several days. For a time frame of less than one second, the times t–3, t–2, t–1, and t can represent times of capturing individual subsequent image frames. For a time frame of several days, the times t–3, t–2, t–1, and t can be selected representative times of subsequent days.

An example of abnormal event detection with a time frame of several days may be detection of vehicles in a driveway. The time t–3 can be, for example, noon on Monday. The times t–2 and t–1 can be noon on Tuesday and noon on Wednesday. The time t can be noon on Thursday. At noon on Monday, Tuesday, and Wednesday, the camera 102 detects no vehicles in the driveway of a property. The abnormal event detector 115 therefore generates a future feature vector $V_{future}$ that includes no vehicle detected in the driveway at noon on Thursday. At noon on Thursday, the camera 102 detects a vehicle in the driveway of the property. The difference between $V_{future}$ and $V_t$ exceeds the threshold T. Therefore, the abnormal event detector 115 determines that the vehicle in the driveway at noon on Thursday is an abnormal event 128.

In some examples, the abnormal event detector 115 can detect abnormal events between more than one cameras. For example, in addition to the camera 102, a property may have an additional camera. The fields of view of the camera 102 and the additional camera may overlap or may be near to each other. The camera 102 and the additional camera may communicate with a common computer system, e.g., a property monitoring system control unit. The camera 102 can generate a future feature vector $V_{future}$ and output the future feature vector $V_{future}$ to the control unit. The additional camera can receive the future feature vector $V_{future}$ from the control unit and can compare the future feature vector $V_{future}$ to an observed feature vector $V_t$ based on an image captured by the additional camera. In this way, the additional camera can detect an abnormal event based on a future feature vector $V_{future}$ generated by the camera 102.

Figure 2:
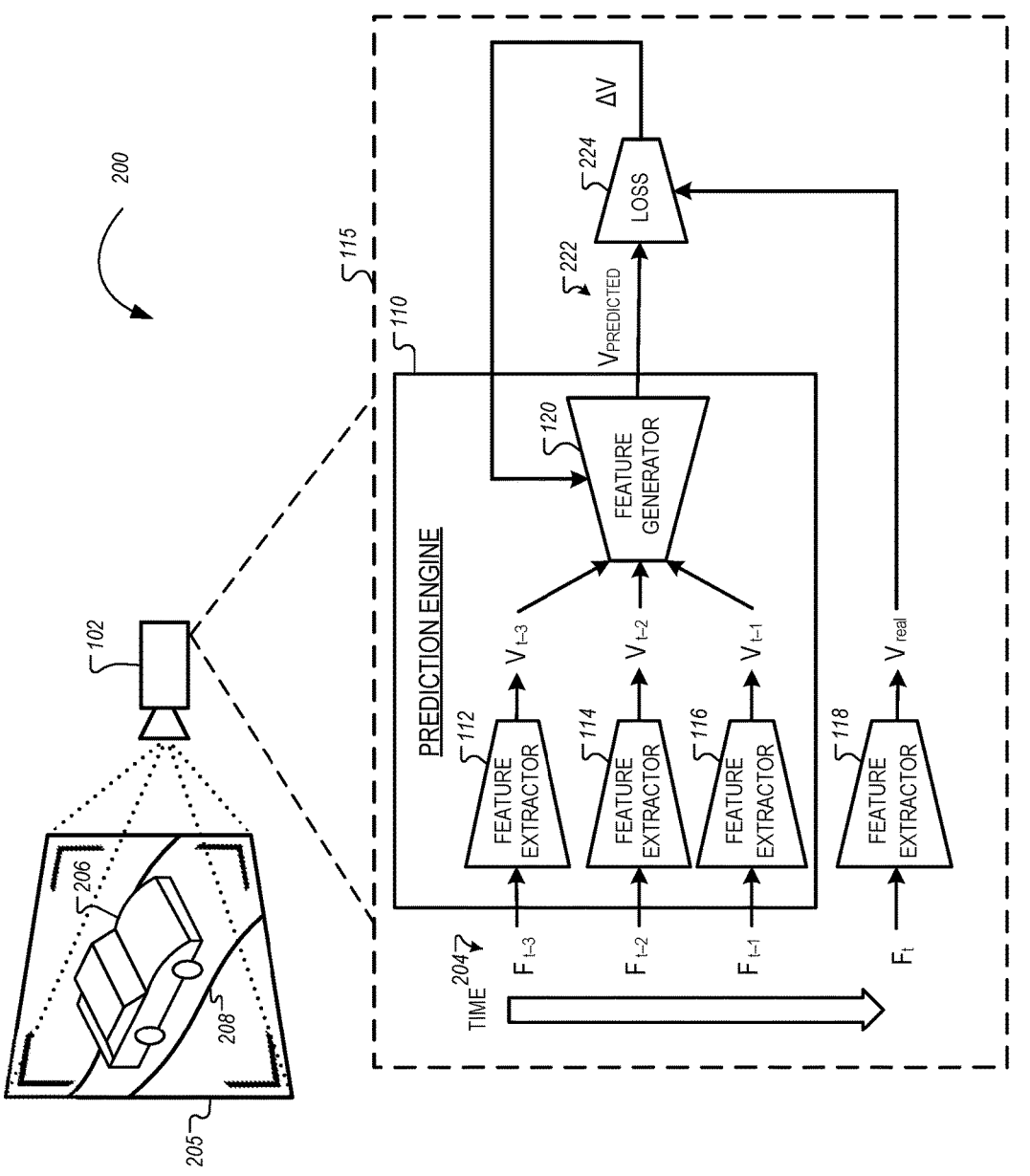
FIG. 2 illustrates an example system for training image-based abnormal event detection systems.

FIG. 2 illustrates an example system 200 for training image-based abnormal event detection systems. For example, the system 200 can be used for training the abnormal event detector 115 of the camera 102. Given inputs representing normal event scenes, the system 200 extracts scene features for multiple time frames. The system 200 then trains the prediction engine 110 to predict future scene features, based on current scene features, in a self-supervised fashion.

Since abnormal events are considered outliers compared to normal events, abnormal event training data might not be used when training the prediction engine 110. In self-supervised training, no additional labels or annotations are required to train the prediction engine 110 other than providing training data from normal events. The dependency between observed features and future features of normal events is learned through machine deep learning during the training process of the system 200.

In FIG. 2, the camera 102 captures video 205. The video 205 includes multiple image frames 204 captured over time. For example, the frames include frame $F_{t-3}$ captured at time t–3, frame $F_{t-2}$ captured at time t–2, frame $F_{t-1}$ captured at time t–1, and frame F captured at time t. The image frames 204 of the video 205 show an outdoor scene of a vehicle 206 in a driveway 208.

The camera 102 includes the abnormal event detector 115. The abnormal event detector 115 includes the prediction engine 110. The prediction engine 110 includes the feature extractors 112, 114, 116, and the feature generator 120.

The prediction engine 110 receives the image frames $F_{t-3}$, $F_{t-2}$, $F_{t-1}$. The feature extractor 112 extracts features from the image frame $F_{t-3}$ The feature extractor 114 extracts features from the image frame $F_{t-2}$ The feature extractor 116 extracts features from the image frame $F_{t-1}$.

The feature extractors 112, 114, 116 output feature vectors $V_{t-3}$, $V_{t-2}$, $V_{t-1}$, respectively. Each feature vector $V_{t-3}$, $V_{t-2}$, $V_{t-1}$ includes data representing features of the image frames $F_{t-3}$, $F_{t-2}$, $F_{t-1}$, respectively. Example features of each image frame $F_{t-3}$, $F_{t-2}$, $F_{t-1}$ of the video 205 can represent a position of the vehicle 206 in the driveway 208. The feature vector $V_{t-3}$ may include data representing the vehicle 206 in the center of the driveway 208 at a certain distance from the camera 102. The feature vector $V_{t-2}$ may include data representing the vehicle 206 in the center of the driveway 208 at a further distance from the camera 102. The feature vector $V_{t-1}$ may include data representing the vehicle 206 in the center of the driveway 208 at an even further distance from the camera 102.

The feature generator 120 can be any neural network sequential data model, e.g., a Hidden Markov Model (HMM), a Long Short-Term Memory (LSTM) model, and/ or an autoencoder model. The feature generator 120 receives the feature vectors $V_{t-3}$, $V_{t-2}$, $V_{t-1}$. Based on the feature vectors $V_{t-3}$, $V_{t-2}$, $V_{t-1}$, the feature generator 120 outputs a predicted feature vector $V_{predicted}$. The predicted feature vector $V_{predicted}$ includes data representing features of a predicted feature vector for a subsequent image frame, e.g., the image frame $F_t$. In some examples, the predicted feature vector $V_{predicted}$ can include a multimodal distribution of future scene features. An example feature of the predicted feature vector $V_{predicted}$ can include an expected position of the vehicle 206 in relation to the driveway 208 and a distance from the camera 102.

The feature extractor 118 extracts features from the image frame $F_t$. In some examples, the image frame $F_t$ is the current, or most recent, frame of the video 205. The feature extractor 118 outputs the observed feature vector $V_{real}$. The observed feature vector $V_{real}$ includes data representing features of the image frame $F_t$. For example, a feature of the observed feature vector $V_{real}$ can include an actual position of the vehicle 206 in relation to the driveway 208 and a distance from the camera 102. The observed feature vector $V_{real}$ can represent a ground truth for training the prediction engine 110.

The loss calculator 224 compares predicted image frame features to actual image frame features to evaluate an accuracy of the prediction engine 110. The loss calculator 224 receives the predicted feature vector $V_{predicted}$ and the observed feature vector $V_{real}$. The loss calculator 224 determines a difference $\Delta V$ between the predicted feature vector $V_{predicted}$ and the observed feature vector $V_{real}$.

The loss calculator 224 can use any appropriate type of loss function to determine the difference $\Delta V$ between the predicted feature vector $V_{predicted}$ and the observed feature vector $V_{real}$. For example, the loss calculator 224 can use a machine learning loss function. The loss calculator 224 outputs the difference $\Delta V$ as feedback to the feature generator 120. For example, the abnormal event detector 115 can generate a backpropagation error based on the difference $\Delta V$. Parameters of the feature generator 120 can then be updated based on the backpropagation error. Training the feature generator to reduce $\Delta V$ can improve abnormal event detection accuracy. Over time, the difference $\Delta V$ decreases, as the predicted feature vector $V_{predicted}$ more accurately predicts the observed feature vector $V_{real}$.

In some examples, individual components or combinations of components of the abnormal event detector 115 can be trained. For example, the loss calculator 224 can output the difference $\Delta V$ as feedback to the feature generator 120, the feature extractors 112, 114, 116, or the entire prediction engine 110. In some examples, a learning rate can be adjusted for each component of the abnormal event detector 115. For example, the learning rate can be higher for certain components, and lower for certain other components of the prediction engine 110.

In some implementations, the system 200 can train the camera 102 prior to installation of the camera 102 at a property. The system 200 can train the camera 102, for example, using a database of image frames representing normal events. In some implementations, the system 200 can train the camera 102 upon initial installation. For example, the camera 102 may have a training phase for a time period of multiple days or weeks. During the training phase, the system 200 can train the camera 102 to the specific installation location using the process described above.

In some implementations, the system 200 can continue to train the camera 102 after installation. For example, as the camera 102 performs inference on videos captured during normal operation, the camera 102 can continually fine-tune itself to the specific installation and normal events that the camera 102 captures over time.

In some examples, the system 200 can train the abnormal event detector 115 on images from an image database. For example, the image database can include images captured by one or more other cameras in addition to, or instead of, images captured by the camera 102. In some examples, the image database can include images representing only normal events. In some examples, the image database can include images similar to images that are likely to be captured by the camera 102. For example, since the camera 102 is positioned to capture images of a driveway 208, the image database can include images from other cameras that are positioned to capture images of driveways.

Figure 3:
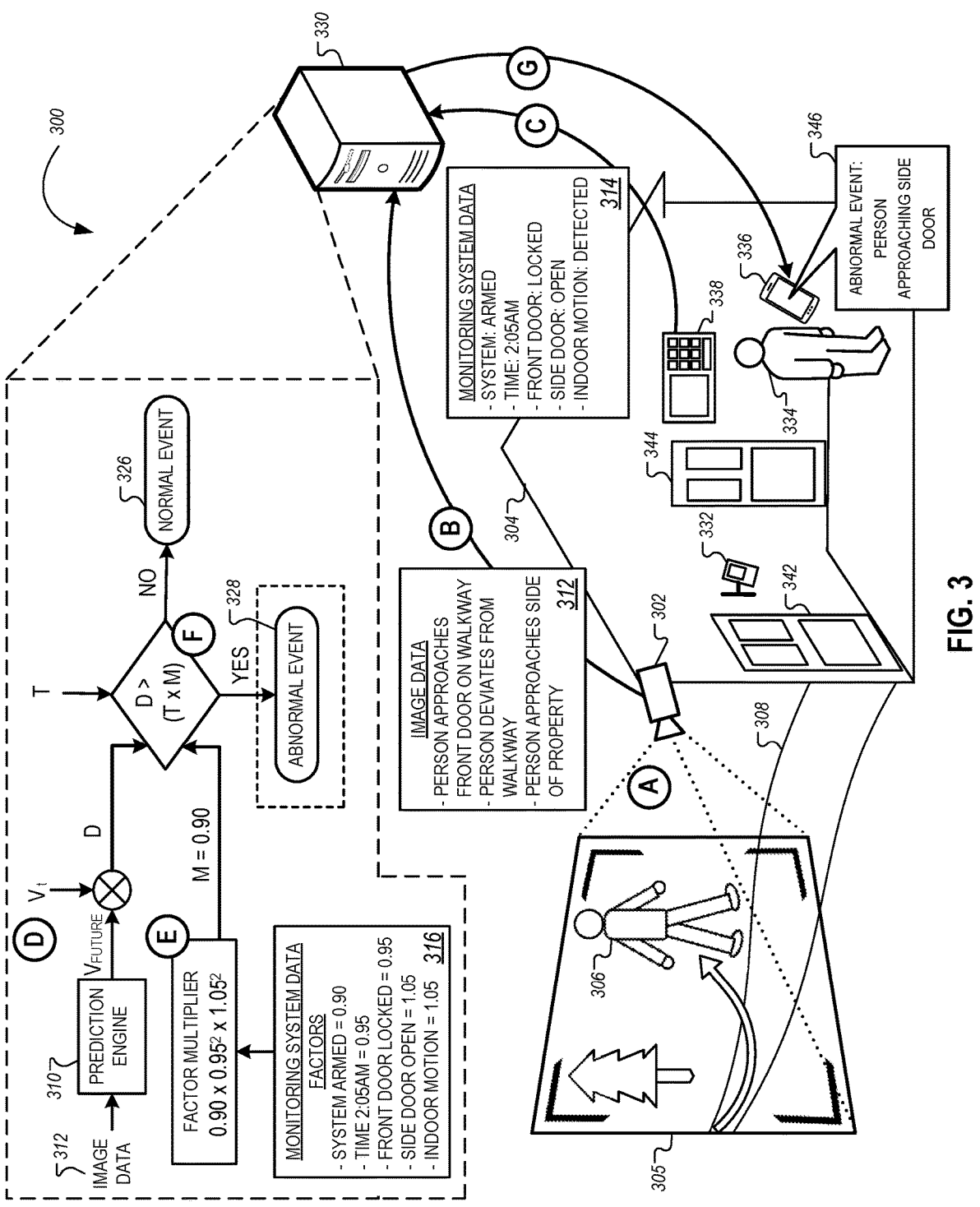
FIG. 3 illustrates an example property monitoring system that includes a system for image-based abnormal event detection.

FIG. 3 illustrates an example property monitoring system 300 that includes a system for image-based abnormal event detection. The property 304 can be a home, another residence, a place of business, a public space, or another facility that has one or more cameras installed and is monitored by the property monitoring system 300.

The property 304 includes a camera 302 installed external to the property 304. The camera 302 is installed near a front door 342, facing a front yard of the property 304. The camera 302 is positioned to capture images within a field of view that includes a region of the front yard, including portions of a path 308 that leads to the front door 342. The camera 302 can record image data, e.g., video, from the field of view. In some implementations, the camera 302 can be configured to record continuously. In some implementations, the camera 302 can be configured to record at designated times, such as on demand or when triggered by another sensor at the property 304.

The property monitoring system 300 includes sensors to monitor conditions at the property 304. The sensors can include the camera 302, a motion sensor 332, and door lock and position sensors for the front door 342 and a side door 344. The sensors collect data at the property 304 and send the data to a control unit 338 of the property monitoring system 300, to a remote monitoring server 330, or both.

The control unit 338 can receive sensor data from the various sensors at the property 304, including the camera 302 and the motion sensor 332. The control unit 338 can send the sensor data to the monitoring server 330. In some examples, sensors can send the sensor data directly to the monitoring server 330. In some examples, the sensors communicate electronically with the control unit 338 through a network.

The network may be any communication infrastructure that supports the electronic exchange of data between the control unit 338 and the sensors. The network may include a local area network (LAN), a wide area network (WAN), the Internet, or other network topology. The network may be any one or combination of wireless or wired networks and may include any one or more of Ethernet, cellular telephony, Bluetooth, Wi-Fi, Z-Wave, ZigBee, Bluetooth, and Bluetooth LE technologies. In some implementations, the network may include optical data links. To support communications through the network, one or more devices of the property monitoring system 300 may include communications modules, such as a modem, transceiver, modulator, or other hardware or software configured to enable the device to communicate electronic data through the network.

The control unit 338 may be a computer system or other electronic device configured to communicate with components of the property monitoring system 300 to cause various functions to be performed for the property monitoring system 300. The control unit 338 may include a processor, a chipset, a memory system, or other computing hardware. In some cases, the control unit 338 may include application-specific hardware, such as a field-programmable gate array (FPGA), an application-specific integrated circuit (ASIC), or other embedded or dedicated hardware. The control unit 338 may include software, which configures the unit to perform the functions described in this disclosure. In some implementations, a resident 334 of the property 304, or another user, communicates with the control unit 338 through a physical connection (e.g., touch screen, keypad, etc.) and/or network connection. In some implementations, the resident 334 or other user communicates with the control unit 338 through a software ("smart home") application installed on a mobile device 336.

The monitoring server 330 can be, for example, one or more computer systems, server systems, or other computing devices. In some examples, the monitoring server 330 is a cloud computing platform. In some examples, the monitoring server 330 communicates with various components of the property monitoring system 300 through the control unit 338. In some examples, the monitoring server 330 may communicate directly with various components of the property monitoring system 300, e.g., the camera 302.

The control unit 338 communicates with the monitoring server 330 via a long-range data link. The long-range data link can include any combination of wired and wireless data networks. For example, the control unit 338 may exchange information with the monitoring server 330 through a wide-area-network (WAN), a cellular telephony network, a cable connection, a digital subscriber line (DSL), a satellite connection, or other electronic means for data transmission. The control unit 338 and the monitoring server 330 may exchange information using any one or more of various communication synchronous or asynchronous protocols, including the 802.11 family of protocols, GSM, 3G, 4G, 5G, LTE, CDMA-based data exchange or other techniques.

In some implementations, the control unit 338 and/or the monitoring server 330 communicates with the mobile device 336, possibly through the network. The mobile device 336 may be, for example, a portable personal computing device, such as a cellphone, a smartphone, a tablet, a laptop, or other electronic device. In some examples, the mobile device 336 is an electronic home assistant or a smart speaker.

FIG. 3 illustrates a flow of data, shown as stages (A) to (G), which can represent steps in an example process. Stages (A) to (G) may occur in the illustrated sequence, or in a sequence that is different from the illustrated sequence. For example, some of the stages may occur concurrently.

In stage (A) of FIG. 3, the camera 302 captures video 305. The video 305 includes image frames of a person 306 walking on the path 308, approaching the front door 342. The video 305 also includes image frames of the person 306 deviating from the path 308, and moving towards a side of the property 304.

In stage (B) of FIG. 3, the monitoring server 330 receives image data 312. The camera 302 can send the image data 312 to the monitoring server 330 over the long-range data link. The image data 312 includes images of the person 306 approaching the front door 342 on the path 308, the person 306 deviating from the path 308, and the person approaching the side of the property 304. In some examples, the camera 302 can send clips of the video 305 to the monitoring server 330. In some examples, the camera 302 can select image frames to send to the monitoring server 330. For example, the camera 302 can select image frames that include an object of interest to send to the monitoring server 330.

In some examples, the camera 302 can perform video analysis on the video 305, and can send results of the video analysis to the monitoring server 330. For example, the camera 302 can determine through video analysis that the person 306 is approaching the side of the property 304. The image data 312 can then send a message to the monitoring server 330 indicating that the person 306 is approaching the side of the property 304. The camera 302 may send the message to the monitoring server 330 in addition to, or instead of, the image frames of the video 305.

In stage (C) of FIG. 3, the monitoring server 330 receives monitoring system data 314. The control unit 338 can send the monitoring system data 314 to the monitoring server 330 over the long-range data link. The monitoring system data 314 can include data points such as a monitoring system status, as well as sensor data from sensors at the property 304. For example, the monitoring system data 314 includes a monitoring system status of "armed." The monitoring system data 314 also includes that the time of day is 2:05 am. The monitoring system data 314 includes data from door sensors that indicate the front door 342 is locked shut, and the side door 344 is open. The monitoring system data includes motion sensor data from the motion sensor 332, indicating that indoor motion is detected at the property 304.

The monitoring server 330 can evaluate the image data 312 and the monitoring system data 314 to determine if an abnormal event is occurring, or has occurred, at the property

304. For example, the monitoring server 330 can analyze the image data 312 to determine positions and movements of objects of interest, e.g., the person 306. The monitoring server 330 also analyzes the monitoring system data 314 and applies weighting factors 316 to the monitoring system data 314.

The factors 316 can be multiplicative values that are multiplied by the threshold T to raise or lower an effective threshold for detecting abnormal events. For example, a factor greater than 1.0, when multiplied by the threshold T, will raise the effective threshold for detecting abnormal events. Raising the effective threshold reduces the likelihood that a deviation will trigger an abnormal event. In contrast, a factor greater than 1.0, when multiplied by the threshold T, will lower the effective threshold for detecting abnormal events. Lowering the effective threshold increases the likelihood that a deviation will trigger an abnormal event.

The monitoring system data factors 316 include a value less than 1.0 for certain monitoring system data points. Specifically, the monitoring server 330 assigns values less than 1.0 for the monitoring system data 314 indicating the system status of "armed," the time 2:05 am, and the front door 342 locked. The system status, time of day, and front door status indicate that it is late at night, and the resident 334 is not likely expecting visitors. Therefore, the monitoring server 330 assigns a value of 0.90 to the system status of "armed," 0.95 to the time of 2:05 am, and 0.95 to the front door 342 locked. These three monitoring system data points have the effect of lowering the effective threshold for detecting abnormal events. Thus, the monitoring server 330 is more likely to determine that the person 306 approaching the side of the property 304 is an abnormal event, based on these factors.

The monitoring system data factors 316 include a value greater than 1.0 for certain monitoring system data points. Specifically, the monitoring server 330 assigns values greater than 1.0 for the monitoring system data 314 indicating the side door 344 is open and indoor motion is detected. The open side door 344 and detected indoor motion indicate that the resident 334 is likely awake and has opened the side door 344, perhaps due to expecting a visitor. Therefore, the monitoring server 330 assigns a value of 1.05 to both the side door 344 open and the detected indoor motion. These two monitoring system data points have the effect of raising the effective threshold for detecting abnormal events. Thus, the monitoring server 330 is less likely to determine that the person 306 approaching the side of the property 304 is an abnormal event, based on these factors.

In stage (D) of FIG. 3, the monitoring server 330 generates a future feature vector $V_{future}$, as described with reference to the system of FIG. 1. Specifically, the monitoring server 330 inputs the image data 312 into a prediction engine 310. The prediction engine 310 outputs the future feature vector $V_{future}$. The monitoring server compares the future feature vector $V_{future}$ to the observed feature vector $V_t$ to determine a distance D.

In stage (E) of FIG. 3, the monitoring server 330 determines a multiplier M based on the factors 316. For example, the monitoring server 330 multiplies the factors 316 for each of the monitoring system data points. The monitoring system multiplies 0.90 by $0.95^2$ by $1.05^2$ to obtain a multiplier M of 0.90. The multiplier M is less than 1.0. Therefore, the combined effects of the factors 316 is to lower the effective threshold, causing the monitoring server 330 to be more likely to determine that the person 306 approaching the side of the property 304 is an abnormal event. The multiplier M less than 1.0 indicates that the factors of the system status "armed," the time 2:05 am, and the front door 342 locked outweigh the factors of the side door 344 open and the detected indoor motion.

At stage (F) of FIG. 3, the monitoring server 330 multiplies the threshold T by the multiplier M to obtain an effective threshold T×M. The monitoring server 330 compares the distance D to the effective threshold T×M. If the distance D is greater than the effective threshold T×M, the monitoring server 330 determines that the person 306 approaching the side of the property 304 represents an abnormal event 328. If the distance D is less than the effective threshold T×M, the monitoring server 330 determines that the person 306 approaching the side of the property 304 represents a normal event 326.

In stage (G) of FIG. 3, based on determining that the person 306 approaching the side of the property 304 represents an abnormal event, the monitoring server 330 sends a notification 346 of the abnormal event 328 to the resident 334. The monitoring server 330 can send the notification 346 via, e.g., the mobile device 336. In some examples, the monitoring server 330 can send the notification 346 to the control unit 338. The notification 346 can include a message that an abnormal event was detected, and can include information related to the type of event detected and the time of detection. For example, the notification 346 can include a message stating "Abnormal Event: Person Approaching Side Door."

In some examples, in response to detecting the abnormal event, the monitoring server 330 can determine to take one or more actions in addition to, or instead of, sending the notification 346. For example, the monitoring server 330 can send a command to the control unit 338 to adjust one or more devices at the property. In response to detecting the person 306 approaching the side of the property 304, for example, the monitoring server 330 can send a command to the control unit 338 to lock the side door 344 and/or to activate a camera positioned at the side of the property 304.

In some examples, the monitoring server 330 can determine not to send a notification to the resident 334 based on detecting a normal event. For example, the monitoring system 200 may be programmed to send a notification to the resident 334 any time the camera 302 detects movement of an object of interest, unless the monitoring server 330 determines that the movement is a normal event.

An example normal event can be the resident 334 returning to the property 304 in the evening, after work. Over time, e.g., using machine deep learning methods, the monitoring server 330 can determine that the resident 334 returning home in the evening is a normal event. The monitoring server 330 can adjust the factors 316 to raise the effective threshold for the normal event.

To raise the effective threshold, the monitoring server 330 can establish a high factor 316 for monitoring system data that indicates the resident 334 is returning to the property 304. For example, the monitoring server 330 can establish a high factor 316 for monitoring system data such as geofence. Geofence data for a vehicle of the resident 334 may indicate that the vehicle is near to the property 304. Assigning a high factor 316 when the vehicle is near to the property 304 raises the effective threshold, lowering the likelihood that the monitoring server 330 will detect an abnormal event.

When the resident 334 parks the vehicle near the property 304, and approaches the camera 302, the camera 302 sends image data 312 of the resident 334 to the monitoring server 330. The appearance of the resident 334 within the field of view of the camera 302 can result in a large distance D between $V_{future}$ and $V_t$. The monitoring server 330 compares the distance D to the effective threshold T×M. Since the multiplier M is higher based on the proximity of the vehicle, the monitoring server 330 determines that the resident 334 approaching the camera 302 is a normal event. Therefore, the monitoring server 330 can determine not to send a notification 346. In this way, the system 300 can reduce the likelihood of the resident 334 receiving a notification in response to the resident 334 returning to the property 304.

In some examples, the resident 334 can adjust settings of the monitoring system 300 to further distinguish normal and abnormal events. For example, the resident 334 can input a setting that the resident 334 returns from work daily between 5:00 pm and 6:00 pm. The monitoring server 330 can then adjust the factors 316 during the time frame of 5:00 pm to 6:00 pm to reduce the likelihood of detecting an abnormal event 328 based on the resident 334 returning to the property 304.

Though described above as being performed by a particular component of system 100 (e.g., the control unit 338 or the monitoring server 330), any of the various control, processing, and analysis operations can be performed by either the control unit 338, the monitoring server 330, or another computer system of the property monitoring system 300. For example, the control unit 338, the monitoring server 330, or another computer system can analyze the data from the sensors to determine system actions. Similarly, the control unit 338, the monitoring server 330, or another computer system can control the various sensors, and/or property automation controls to collect data or control device operation.

FIG. 4 is a flow chart illustrating an example of a process 400 for machine learning motion sensing with auxiliary sensors. The process 400 can be performed by a computing system. For example, the process 400 can be performed by the camera 302, the control unit 338, or the monitoring server 330 of the monitoring system 300.

Briefly, process 400 includes obtaining a sequential set of images captured by a camera (402), generating a set of observed features for each of the images (404), generating a set of predicted features based on a portion of the sets of observed features that excludes the set of observed features for a last image in the sequential set of images; (406), determining that a difference between the set of predicted features and the set of observed features for the last image in the sequential set of images satisfies abnormal event criteria (408), and in response to determining that the difference between the set of predicted features and the set of observed features for the last image in the sequential set of images satisfies abnormal event criteria, classifying the set of sequential images as showing an abnormal event (410).

In additional detail, the process 400 includes obtaining a sequential set of images captured by a camera (402). For example, a camera can be positioned to view a scene that includes the one-way eastbound street. The sequential set of images can include images of vehicles traveling on the one-way street. The sequential set of images can be captured over various time frames, e.g., a time frame of seconds, minutes, or hours, with each image being a representative image from an interval of time within the time frame.

In some implementations, the last image in the sequential set of images includes an image frame more recently captured than any other image in the sequential set of images. For example, the sequential set of images can include images $F_{t-3}$, $F_{t-2}$, $F_{t-1}$, and $F_t$. Each of the images $F_{t-3}$ to $F_t$ may show vehicles traveling on the one-way street. The last image $F_t$ is more recently captured than any other of the images $F_{t-3}$, $F_{t-2}$, or $F_{t-1}$.

In some implementations, the sequential set of images includes a plurality of consecutive image frames. For example, the image $F_t$ may be the next consecutive image frame following image $F_{t-1}$, and the image $F_{t-1}$ may be the next consecutive image frame following image $F_{t-2}$.

In some implementations, the sequential set of images includes a plurality of non-consecutive image frames. For example, the image $F_t$ may be an image that is two or more frames following image $F_{t-1}$, and the image $F_{t-1}$ may be an image that is two or more frames following image $F_{t-2}$.

In some implementations, the sequential set of images includes a plurality of image frames captured at periodic time intervals. For example, a periodic interval may be once per 0.1 seconds, once per 0.07 seconds, or once per 0.03 seconds. For a periodic time interval of 0.1 seconds, the image $F_t$ may be an image that is captured 0.1 seconds following the image $F_{t-1}$, and the image $F_{t-1}$ may be an image that is captured 0.1 seconds following the image $F_{t-2}$.

The process 400 includes generating a set of observed features for each of the images (404). In some implementations, generating the set of observed features for each of the images includes generating a vector of observed feature values. For example, the system can generate vectors of observed feature values $V_{t-3}$, $V_{t-2}$, and $V_{t-1}$ for each of the images $F_{t-3}$, $F_{t-2}$, and $F_{t-1}$, respectively. The vectors of observed feature values can include values representing features of the image frames, such as positions and orientations of vehicles within the image frames.

In some implementations, the observed features and predicted features each include one or more of colors, textures, shapes, object positions, object edges, and boundaries, and any types of visual feature representations capturing the above. For example, the features can include the color, size, and shape of the vehicles in each image of the one-way street. Additionally, the features can include a make and model of each vehicle. The features can also include a direction of movement of the vehicles, based on the position and orientation of the front and rear of the vehicles.

The process 400 includes generating a set of predicted features based on a portion of the sets of observed features that excludes the set of observed features for a last image in the sequential set of images (406). For example, the portion of the sets of observed features can include all vehicles traveling in an eastbound direction. The last image in the sequential set of images may include a vehicle traveling in a westbound direction. Generating the set of predicted features from the portion of the sets of observed features that excludes the set of observed features for the last image can include generating a predicted direction of travel, e.g., eastbound, for the vehicles.

In some implementations, generating the set of predicted features based on a portion of the sets of observed features that excludes the set of observed features for a last image in the sequential set of images includes processing the vector of observed feature values for each of the images with a prediction model to obtain an output of the prediction model. The output of the prediction model includes a vector of predicted feature values. For example, the prediction model can be the feature generator 120. The system can process the vectors $V_{t-3}$, $V_{t-2}$, and $V_{t-1}$ using the feature generator 120. The system can obtain an output of the feature generator 120 that includes a vector of predicted feature values, e.g., $V_{predicted}$. The vector $V_{predicted}$ may include values representing predicted features of the image frame $F_t$. The predicted features of the image frame $F_t$ may include, for example, a predicted vehicle position, vehicle orientation, and/or direction of vehicle travel along the one-way street.

In some implementations, the process 400 includes providing, to the prediction model, sets of observed features for each image of a sequential set of images classified as showing a normal event and receiving, as output from the prediction model, a set of predicted features. The process can include comparing the output from the prediction model to a set of observed features for the last image of the sequential set of images. For example, the system can compare the vector $V_{predicted}$ to values of observed feature vector $V_{real}$, which represent the set of observed features for the last image $F_t$. Based on comparing the output from the prediction model to the set of observed features for the last image of the sequential set of images, the system can adjust parameters of the prediction model. For example, the loss calculator 224 can determine a difference $\Delta V$ between the predicted feature vector $V_{predicted}$ and the observed feature vector $V_{real}$. The system can adjust parameters, e.g., weights, of the feature generator 120 based on the difference $\Delta V$.

In some implementations, the process 400 includes using sequential sets of images that are classified as showing a normal event to train the prediction model to predict features of a last image of a sequential set of images. For example, the multiple image frames 204 can include a sequential set of images that show a normal event such as vehicles traveling eastbound on a one-way eastbound street. The system can use the multiple image frames 204 to train the feature generator 120 to predict features of the last image $F_t$. In some implementations, the system can use a database of images that are classified as showing a normal event to train the feature generator. For example, the database of images can include video clips of normal events captured by the camera 102. In some implementations, the database of images can include video clips of normal events captured by other cameras of the monitoring system, or by other cameras of other monitoring systems. In some implementations, the database of images can include video clips that were labeled as normal events by a human.

In some implementations, the prediction model is a machine learning model. A prediction model such as the feature generator 120 can be, for example, a neural network, a support vector machine, a classifier, a regression model, a reinforcement learning model, a clustering model, a decision tree, a random forest model, a genetic algorithm, a Bayesian model, or a Gaussian mixture model.

In some implementations, the process 400 includes accessing stored data indicating features of objects classified as familiar objects. For example, the system may access a database including features of familiar objects, e.g., features of a vehicle that commonly parks at the property 304. The system can identify one or more observed features of the sequential set of images that matches a feature of at least one of the familiar objects. For example, the system may identify a vehicle with a make, model, and color that matches the make, model, and color of the vehicle that commonly parks at the property 304. Based on determining that one or more observed features of the sequential set of images matches a feature of at least one of the familiar objects, the system can filter the familiar features from the set of observed features. For example, for an image including the vehicle with the familiar make, model, and color, the feature extractor may filter the familiar features from the set of observed features. For example, the feature extractor may generate a feature vector that excludes the familiar features of the vehicle.

The process 400 includes determining that the difference between the set of predicted features and the set of observed features for a last image in the sequential set of images satisfies abnormal event criteria (408). Determining the difference between the set of predicted features and the set of observed features for a last image in the sequential set of images can include determining the difference between the predicted eastbound direction of travel and the observed westbound direction of travel for the vehicle in the last image.

In some implementations, the difference between the set of predicted features and the set of observed features for a last image in the sequential set of images includes a distance between the vector of observed feature values and the vector of predicted feature values. For example, the system can use distance functions to determine distance metrics between values of the vector $V_{future}$ and the vector $V_t$. Distance metrics can include, for example, Minkowski distance, Manhattan distance, L1 norm, L2 norm, Euclidean distance, Hamming distance, or Cosine Distance. The system can use the distance functions to determine a distance D between the vector of observed feature values and the vector of predicted feature values.

In some implementations, determining that the difference between the set of predicted features and the set of observed features for a last image in the sequential set of images satisfies abnormal event criteria includes determining that the difference between the set of predicted features and the set of observed features for a last image in the sequential set of images is greater than a threshold difference. The abnormal event criteria can be, for example, a threshold distance T between the vector of observed feature values and the vector of predicted feature values.

In some implementations, the process includes obtaining sensor data from one or more sensors installed at the property; and adjusting the threshold difference based on the sensor data. For example, the sensor data can include motion sensor data from a motion sensor. The motion sensor data may indicate no motion detected inside a property.

In some implementations, adjusting the threshold difference based on the sensor data includes assigning a weighting factor to the sensor data; and adjusting the threshold difference based on the weighting factor. For example, the system may assign a weighting factor of 0.9 to the sensor data. The system can adjust the threshold difference based on the weighting factor, e.g., by multiplying the threshold difference T by the weighting factor of 0.9.

The process 400 includes, in response to determining that the difference between the set of predicted features and the set of observed features for a last image in the sequential set of images satisfies abnormal event criteria, classifying the set of sequential images as showing an abnormal event (410). For example, in response to determining that a vehicle in the last image is traveling westbound, while the predicted direction of travel is eastbound, the abnormal event detector classifies the set of sequential images as showing an abnormal event.

In some implementations, the process 400 includes, based on classifying the set of sequential images as showing an abnormal event, performing one or more actions. For example, based on determining that the vehicle in the last image is traveling westbound, the system can perform an action. The system may perform an action, e.g., of activating an alarm or a warning signal to warn the vehicle.

In some implementations, the process 400 includes obtaining a different sequential set of images captured by the camera. For example, the different sequential set of images may include vehicles traveling eastbound on the eastbound one-way street. The system can generate a set of observed features for each of the images and a set of predicted features from a portion of the sets of observed features that excludes the set of observed features for a last image in the sequential set of images. The set of predicted features can include a vehicle traveling eastbound on the one-way street. The system may determine that a difference between the set of predicted features and the set of observed features for a last image in the sequential set of images does not satisfy abnormal event criteria. For example, the last image may show a vehicle traveling eastbound, and the system may determine that the distance between the predicted feature vector and the observed feature vector of the last image is less than a threshold distance. In response to determining that the difference between the set of predicted features and the set of observed features for the last image in the sequential set of images does not satisfy abnormal event criteria, the system can classify the set of sequential images as showing a normal event. For example, in response to determining that the distance between the predicted feature vector and the observed feature vector of the last image is less than the threshold distance, the system can classify the set of images as a normal event.

Figure 5:
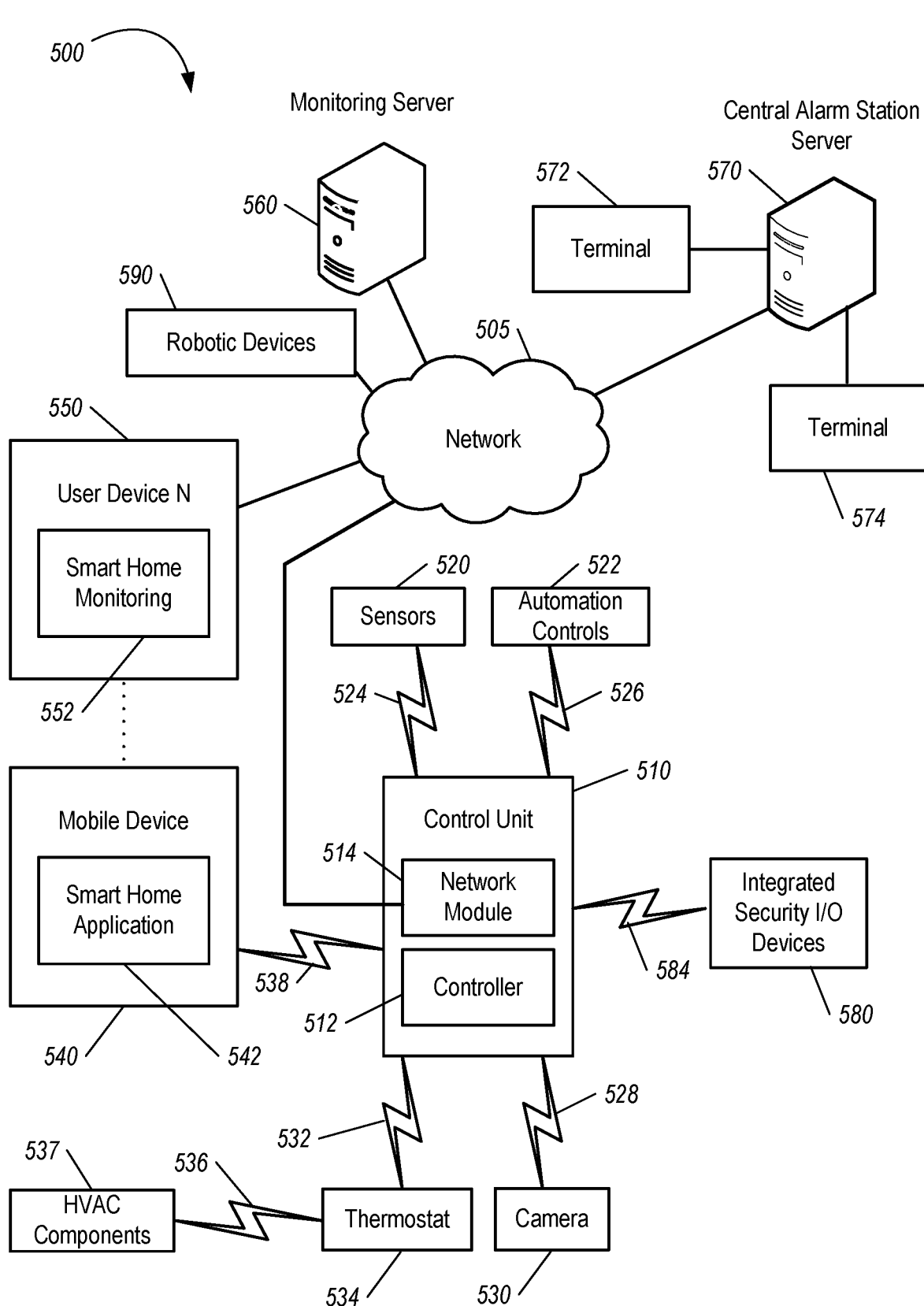
FIG. 5 is a diagram illustrating an example of a home monitoring system.

FIG. 5 is a diagram illustrating an example of a home monitoring system 500. The monitoring system 500 includes a network 505, a control unit 510, one or more user devices 540 and 550, a monitoring server 560, and a central alarm station server 570. In some examples, the network 505 facilitates communications between the control unit 510, the one or more user devices 540 and 550, the monitoring server 560, and the central alarm station server 570.

The network 505 is configured to enable exchange of electronic communications between devices connected to the network 505. For example, the network 505 may be configured to enable exchange of electronic communications between the control unit 510, the one or more user devices 540 and 550, the monitoring server 560, and the central alarm station server 570. The network 505 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 505 may include multiple networks or subnetworks, each of which may include, for example, a wired or wireless data pathway. The network 505 may include a circuit-switched network, a packet-switched data network, or any other network able to carry electronic communications (e.g., data or voice communications). For example, the network 505 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 505 may include one or more networks that include wireless data channels and wireless voice channels. The network 505 may be a wireless network, a broadband network, or a combination of networks including a wireless network and a broadband network.

The control unit 510 includes a controller 512 and a network module 514. The controller 512 is configured to control a control unit monitoring system (e.g., a control unit system) that includes the control unit 510. In some examples, the controller 512 may include a processor or other control circuitry configured to execute instructions of a program that controls operation of a control unit system. In these examples, the controller 512 may be configured to receive input from sensors, flow meters, or other devices included in the control unit system and control operations of devices included in the household (e.g., speakers, lights, doors, etc.). For example, the controller 512 may be configured to control operation of the network module 514 included in the control unit 510.

The network module 514 is a communication device configured to exchange communications over the network 505. The network module 514 may be a wireless communication module configured to exchange wireless communications over the network 505. For example, the network module 514 may be a wireless communication device configured to exchange communications over a wireless data channel and a wireless voice channel. In this example, the network module 514 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 514 also may be a wired communication module configured to exchange communications over the network 505 using a wired connection. For instance, the network module 514 may be a modem, a network interface card, or another type of network interface device. The network module 514 may be an Ethernet network card configured to enable the control unit 510 to communicate over a local area network and/or the Internet. The network module 514 also may be a voice band modem configured to enable the alarm panel to communicate over the telephone lines of Plain Old Telephone Systems (POTS).

The control unit system that includes the control unit 510 includes one or more sensors. For example, the monitoring system may include multiple sensors 520. The sensors 520 may include a lock sensor, a contact sensor, a motion sensor, or any other type of sensor included in a control unit system. The sensors 520 also may include an environmental sensor, such as a temperature sensor, a water sensor, a rain sensor, a wind sensor, a light sensor, a smoke detector, a carbon monoxide detector, an air quality sensor, etc. The sensors 520 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the health-monitoring sensor can be a wearable sensor that attaches to a user in the home. The health-monitoring sensor can collect various health data, including pulse, heart rate, respiration rate, sugar or glucose level, bodily temperature, or motion data.

The sensors 520 can also include a radio-frequency identification (RFID) sensor that identifies a particular article that includes a pre-assigned RFID tag.

The control unit 510 communicates with the home automation controls 522 and a camera 530 to perform monitoring. The home automation controls 522 are connected to one or more devices that enable automation of actions in the home. For instance, the home automation controls 522 may be connected to one or more lighting systems and may be configured to control operation of the one or more lighting systems. In addition, the home automation controls 522 may be connected to one or more electronic locks at the home and may be configured to control operation of the one or more electronic locks (e.g., control Z-Wave locks using wireless communications in the Z-Wave protocol). Further, the home automation controls 522 may be connected to one or more appliances at the home and may be configured to control operation of the one or more appliances. The home automation controls 522 may include multiple modules that are each specific to the type of device being controlled in an automated manner. The home automation controls 522 may control the one or more devices based on commands received from the control unit 510. For instance, the home automation controls 522 may cause a lighting system to illuminate an area to provide a better image of the area when captured by a camera 530.

The camera 530 may be a video/photographic camera or other type of optical sensing device configured to capture images. For instance, the camera 530 may be configured to capture images of an area within a building or home monitored by the control unit 510. The camera 530 may be configured to capture single, static images of the area and also video images of the area in which multiple images of the area are captured at a relatively high frequency (e.g., thirty images per second). The camera 530 may be controlled based on commands received from the control unit 510.

The camera 530 may be triggered by several different types of techniques. For instance, a Passive Infra-Red (PIR) motion sensor may be built into the camera 530 and used to trigger the camera 530 to capture one or more images when motion is detected. The camera 530 also may include a microwave motion sensor built into the camera and used to trigger the camera 530 to capture one or more images when motion is detected. The camera 530 may have a "normally open" or "normally closed" digital input that can trigger capture of one or more images when external sensors (e.g., the sensors 520, PIR, door/window, etc.) detect motion or other events. In some implementations, the camera 530 receives a command to capture an image when external devices detect motion or another potential alarm event. The camera 530 may receive the command from the controller 512 or directly from one of the sensors 520.

In some examples, the camera 530 triggers integrated or external illuminators (e.g., Infra-Red, Z-wave controlled "white" lights, lights controlled by the home automation controls 522, etc.) to improve image quality when the scene is dark. An integrated or separate light sensor may be used to determine if illumination is desired and may result in increased image quality.

The camera 530 may be programmed with any combination of time/day schedules, system "arming state", or other variables to determine whether images should be captured or not when triggers occur. The camera 530 may enter a low-power mode when not capturing images. In this case, the camera 530 may wake periodically to check for inbound messages from the controller 512. The camera 530 may be powered by internal, replaceable batteries if located remotely from the control unit 510. The camera 530 may employ a small solar cell to recharge the battery when light is available. Alternatively, the camera 530 may be powered by the controller's 512 power supply if the camera 530 is co-located with the controller 512.

In some implementations, the camera 530 communicates directly with the monitoring server 560 over the Internet. In these implementations, image data captured by the camera 530 does not pass through the control unit 510 and the camera 530 receives commands related to operation from the monitoring server 560.

The system 500 also includes thermostat 534 to perform dynamic environmental control at the home. The thermostat 534 is configured to monitor temperature and/or energy consumption of an HVAC system associated with the thermostat 534, and is further configured to provide control of environmental (e.g., temperature) settings. In some implementations, the thermostat 534 can additionally or alternatively receive data relating to activity at a home and/or environmental data at a home, e.g., at various locations indoors and outdoors at the home. The thermostat 534 can directly measure energy consumption of the HVAC system associated with the thermostat, or can estimate energy consumption of the HVAC system associated with the thermostat 534, for example, based on detected usage of one or more components of the HVAC system associated with the thermostat 534. The thermostat 534 can communicate temperature and/or energy monitoring information to or from the control unit 510 and can control the environmental (e.g., temperature) settings based on commands received from the control unit 510.

In some implementations, the thermostat 534 is a dynamically programmable thermostat and can be integrated with the control unit 510. For example, the dynamically programmable thermostat 534 can include the control unit 510, e.g., as an internal component to the dynamically programmable thermostat 534. In addition, the control unit 510 can be a gateway device that communicates with the dynamically programmable thermostat 534. In some implementations, the thermostat 534 is controlled via one or more home automation controls 522.

A module 537 is connected to one or more components of an HVAC system associated with a home, and is configured to control operation of the one or more components of the HVAC system. In some implementations, the module 537 is also configured to monitor energy consumption of the HVAC system components, for example, by directly measuring the energy consumption of the HVAC system components or by estimating the energy usage of the one or more HVAC system components based on detecting usage of components of the HVAC system. The module 537 can communicate energy monitoring information and the state of the HVAC system components to the thermostat 534 and can control the one or more components of the HVAC system based on commands received from the thermostat 534.

The system 500 further includes one or more integrated security devices 580. The one or more integrated security devices may include any type of device used to provide alerts based on received sensor data. For instance, the one or more control units 510 may provide one or more alerts to the one or more integrated security input/output devices 580. Additionally, the one or more control units 510 may receive one or more sensor data from the sensors 520 and determine whether to provide an alert to the one or more integrated security input/output devices 580.

The sensors 520, the home automation controls 522, the camera 530, the thermostat 534, and the integrated security devices 580 may communicate with the controller 512 over communication links 524, 526, 528, 532, 538, and 584. The communication links 524, 526, 528, 532, 538, and 584 may be a wired or wireless data pathway configured to transmit signals from the sensors 520, the home automation controls 522, the camera 530, the thermostat 534, and the integrated security devices 580 to the controller 512. The sensors 520, the home automation controls 522, the camera 530, the thermostat 534, and the integrated security devices 580 may continuously transmit sensed values to the controller 512, periodically transmit sensed values to the controller 512, or transmit sensed values to the controller 512 in response to a change in a sensed value.

The communication links 524, 526, 528, 532, 538, and 584 may include a local network. The sensors 520, the home automation controls 522, the camera 530, the thermostat 534, and the integrated security devices 580, and the controller 512 may exchange data and commands over the local network. The local network may include 802.11 "Wi-Fi" wireless Ethernet (e.g., using low-power Wi-Fi chipsets), Z-Wave, Zigbee, Bluetooth, "Homeplug" or other "Powerline" networks that operate over AC wiring, and a Category 5 (CAT5) or Category 6 (CAT6) wired Ethernet network. The local network may be a mesh network constructed based on the devices connected to the mesh network.

The monitoring server 560 is an electronic device configured to provide monitoring services by exchanging electronic communications with the control unit 510, the one or more user devices 540 and 550, and the central alarm station server 570 over the network 505. For example, the monitoring server 560 may be configured to monitor events generated by the control unit 510. In this example, the monitoring server 560 may exchange electronic communications with the network module 514 included in the control unit 510 to receive information regarding events detected by the control unit 510. The monitoring server 560 also may receive information regarding events from the one or more user devices 540 and 550.

In some examples, the monitoring server 560 may route alert data received from the network module 514 or the one or more user devices 540 and 550 to the central alarm station server 570. For example, the monitoring server 560 may transmit the alert data to the central alarm station server 570 over the network 505.

The monitoring server 560 may store sensor and image data received from the monitoring system and perform analysis of sensor and image data received from the monitoring system. Based on the analysis, the monitoring server 560 may communicate with and control aspects of the control unit 510 or the one or more user devices 540 and 550.

The monitoring server 560 may provide various monitoring services to the system 500. For example, the monitoring server 560 may analyze the sensor, image, and other data to determine an activity pattern of a resident of the home monitored by the system 500. In some implementations, the monitoring server 560 may analyze the data for alarm conditions or may determine and perform actions at the home by issuing commands to one or more of the controls 522, possibly through the control unit 510.

The monitoring server 560 can be configured to provide information (e.g., activity patterns) related to one or more residents of the home monitored by the system 500 (e.g., resident 334). For example, one or more of the sensors 520, the home automation controls 522, the camera 530, the thermostat 534, and the integrated security devices 580 can collect data related to a resident including location information (e.g., if the resident is home or is not home) and provide location information to the thermostat 534.

The central alarm station server 570 is an electronic device configured to provide alarm monitoring service by exchanging communications with the control unit 510, the one or more user devices 540 and 550, and the monitoring server 560 over the network 505. For example, the central alarm station server 570 may be configured to monitor alerting events generated by the control unit 510. In this example, the central alarm station server 570 may exchange communications with the network module 514 included in the control unit 510 to receive information regarding alerting events detected by the control unit 510. The central alarm station server 570 also may receive information regarding alerting events from the one or more user devices 540 and 550 and/or the monitoring server 560.

The central alarm station server 570 is connected to multiple terminals 572 and 574. The terminals 572 and 574 may be used by operators to process alerting events. For example, the central alarm station server 570 may route alerting data to the terminals 572 and 574 to enable an operator to process the alerting data. The terminals 572 and 574 may include general-purpose computers (e.g., desktop personal computers, workstations, or laptop computers) that are configured to receive alerting data from a server in the central alarm station server 570 and render a display of information based on the alerting data. For instance, the controller 512 may control the network module 514 to transmit, to the central alarm station server 570, alerting data indicating that a sensor 520 detected motion from a motion sensor via the sensors 520. The central alarm station server 570 may receive the alerting data and route the alerting data to the terminal 572 for processing by an operator associated with the terminal 572. The terminal 572 may render a display to the operator that includes information associated with the alerting event (e.g., the lock sensor data, the motion sensor data, the contact sensor data, etc.) and the operator may handle the alerting event based on the displayed information.

In some implementations, the terminals 572 and 574 may be mobile devices or devices designed for a specific function. Although FIG. 5 illustrates two terminals for brevity, actual implementations may include more (and, perhaps, many more) terminals.

The one or more authorized user devices 540 and 550 are devices that host and display user interfaces. For instance, the user device 540 is a mobile device that hosts or runs one or more native applications (e.g., the home monitoring application 542). The user device 540 may be a cellular phone or a non-cellular locally networked device with a display. The user device 540 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 540 may perform functions unrelated to the monitoring system, such as placing personal telephone calls, playing music, playing video, displaying pictures, browsing the Internet, maintaining an electronic calendar, etc.

The user device 540 includes a home monitoring application 552. The home monitoring application 542 refers to a software/firmware program running on the corresponding mobile device that enables the user interface and features described throughout. The user device 540 may load or install the home monitoring application 542 based on data received over a network or data received from local media. The home monitoring application 542 runs on mobile devices platforms, such as iPhone, iPod touch, Blackberry, Google Android, Windows Mobile, etc. The home monitoring application 542 enables the user device 540 to receive and process image and sensor data from the monitoring system.

The user device 540 may be a general-purpose computer (e.g., a desktop personal computer, a workstation, or a laptop computer) that is configured to communicate with the monitoring server 560 and/or the control unit 510 over the network 505. The user device 540 may be configured to display a smart home user interface 552 that is generated by the user device 540 or generated by the monitoring server 560. For example, the user device 540 may be configured to display a user interface (e.g., a web page) provided by the monitoring server 560 that enables a user to perceive images captured by the camera 530 and/or reports related to the monitoring system. Although FIG. 5 illustrates two user devices for brevity, actual implementations may include more (and, perhaps, many more) or fewer user devices.

In some implementations, the one or more user devices 540 and 550 communicate with and receive monitoring system data from the control unit 510 using the communication link 538. For instance, the one or more user devices 540 and 550 may communicate with the control unit 510 using various local wireless protocols such as Wi-Fi, Bluetooth, Z-wave, Zigbee, HomePlug (ethernet over power line), or wired protocols such as Ethernet and USB, to connect the one or more user devices 540 and 550 to local security and automation equipment. The one or more user devices 540 and 550 may connect locally to the monitoring system and its sensors and other devices. The local connection may improve the speed of status and control communications because communicating through the network 505 with a remote server (e.g., the monitoring server 560) may be significantly slower.

Although the one or more user devices 540 and 550 are shown as communicating with the control unit 510, the one or more user devices 540 and 550 may communicate directly with the sensors and other devices controlled by the control unit 510. In some implementations, the one or more user devices 540 and 550 replace the control unit 510 and perform the functions of the control unit 510 for local monitoring and long range/offsite communication.

In other implementations, the one or more user devices 540 and 550 receive monitoring system data captured by the control unit 510 through the network 505. The one or more user devices 540, 550 may receive the data from the control unit 510 through the network 505 or the monitoring server 560 may relay data received from the control unit 510 to the one or more user devices 540 and 550 through the network 505. In this regard, the monitoring server 560 may facilitate communication between the one or more user devices 540 and 550 and the monitoring system.

In some implementations, the one or more user devices 540 and 550 may be configured to switch whether the one or more user devices 540 and 550 communicate with the control unit 510 directly (e.g., through link 538) or through the monitoring server 560 (e.g., through network 505) based on a location of the one or more user devices 540 and 550. For instance, when the one or more user devices 540 and 550 are located close to the control unit 510 and in range to communicate directly with the control unit 510, the one or more user devices 540 and 550 use direct communication. When the one or more user devices 540 and 550 are located far from the control unit 510 and not in range to communicate directly with the control unit 510, the one or more user devices 540 and 550 use communication through the monitoring server 560.

Although the one or more user devices 540 and 550 are shown as being connected to the network 505, in some implementations, the one or more user devices 540 and 550 are not connected to the network 505. In these implementations, the one or more user devices 540 and 550 communicate directly with one or more of the monitoring system components and no network (e.g., Internet) connection or reliance on remote servers is needed.

In some implementations, the one or more user devices 540 and 550 are used in conjunction with only local sensors and/or local devices in a house. In these implementations, the system 500 includes the one or more user devices 540 and 550, the sensors 520, the home automation controls 522, the camera 530, and robotic devices 590. The one or more user devices 540 and 550 receive data directly from the sensors 520, the home automation controls 522, the camera 530, and the robotic devices 590, and sends data directly to the sensors 520, the home automation controls 522, the camera 530, and the robotic devices 590. The one or more user devices 540, 550 provide the appropriate interfaces/ processing to provide visual surveillance and reporting.

In other implementations, the system 500 further includes network 505 and the sensors 520, the home automation controls 522, the camera 530, the thermostat 534, and the robotic devices 590, and are configured to communicate sensor and image data to the one or more user devices 540 and 550 over network 505 (e.g., the Internet, cellular network, etc.). In yet another implementation, the sensors 520, the home automation controls 522, the camera 530, the thermostat 534, and the robotic devices 590 (or a component, such as a bridge/router) are intelligent enough to change the communication pathway from a direct local pathway when the one or more user devices 540 and 550 are in close physical proximity to the sensors 520, the home automation controls 522, the camera 530, the thermostat 534, and the robotic devices 590 to a pathway over network 505 when the one or more user devices 540 and 550 are farther from the sensors 520, the home automation controls 522, the camera 530, the thermostat 534, and the robotic devices 590.

In some examples, the system leverages GPS information from the one or more user devices 540 and 550 to determine whether the one or more user devices 540 and 550 are close enough to the sensors 520, the home automation controls 522, the camera 530, the thermostat 534, and the robotic devices 590 to use the direct local pathway or whether the one or more user devices 540 and 550 are far enough from the sensors 520, the home automation controls 522, the camera 530, the thermostat 534, and the robotic devices 590 that the pathway over network 505 is required.

In other examples, the system leverages status communications (e.g., pinging) between the one or more user devices 540 and 550 and the sensors 520, the home automation controls 522, the camera 530, the thermostat 534, and the robotic devices 590 to determine whether communication using the direct local pathway is possible. If communication using the direct local pathway is possible, the one or more user devices 540 and 550 communicate with the sensors 520, the home automation controls 522, the camera 530, the thermostat 534, and the robotic devices 590 using the direct local pathway. If communication using the direct local pathway is not possible, the one or more user devices 540 and 550 communicate with the sensors 520, the home automation controls 522, the camera 530, the thermostat 534, and the robotic devices 590 using the pathway over network 505.

In some implementations, the system 500 provides end users with access to images captured by the camera 530 to aid in decision making. The system 500 may transmit the images captured by the camera 530 over a wireless WAN network to the user devices 540 and 550. Because transmission over a wireless WAN network may be relatively expensive, the system 500 can use several techniques to reduce costs while providing access to significant levels of useful visual information (e.g., compressing data, down-sampling data, sending data only over inexpensive LAN connections, or other techniques).

In some implementations, a state of the monitoring system and other events sensed by the monitoring system may be used to enable/disable video/image recording devices (e.g., the camera 530). In these implementations, the camera 530 may be set to capture images on a periodic basis when the alarm system is armed in an "away" state, but set not to capture images when the alarm system is armed in a "home" state or disarmed. In addition, the camera 530 may be triggered to begin capturing images when the alarm system detects an event, such as an alarm event, a door-opening event for a door that leads to an area within a field of view of the camera 530, or motion in the area within the field of view of the camera 530. In other implementations, camera 530 may capture images continuously, but the captured images may be stored or transmitted over a network when needed.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device.

Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

The invention claimed is:

1. A computer-implemented method comprising:

obtaining, by one or more computers, a sequential set of images including one or more earlier images and a latter image captured after each of the one or more earlier images, wherein at least some of the images of the sequential set of images depict an object;

generating, by the one or more computers, a first set of observed features including a first observed direction of travel of the object in an earlier image of the one or more earlier images in the sequential set of images;

generating, by the one or more computers, a set of predicted features for the latter image using a prediction model and the first set of observed features, the set of predicted features including a predicted direction of travel of the object in the latter image;

generating, by the one or more computers, a latter set of observed features including a latter observed direction of travel of the object in the latter image;

determining, by the one or more computers, whether a difference between the predicted direction of travel of the object in the latter image and the latter observed direction of travel of the object in the latter image satisfies a threshold difference; and using a result of the determination whether the difference between the predicted direction of travel of the object in the latter image and the latter observed direction of travel of the object in the latter image satisfies the threshold difference, selectively classifying, by the one or more computers, the sequential set of images as showing an abnormal event or as not showing an abnormal event.

2. The computer-implemented method of claim 1, comprising:

in response to classifying the sequential set of images as showing an abnormal event, performing one or more actions.

3. The computer-implemented method of claim 1, comprising:

generating, by the one or more computers, a second set of observed features including a second observed direction of travel of the object in a second earlier image of the one or more earlier images in the sequential set of images, wherein:

generating the set of predicted features for the latter image in the sequential set of images comprises generating, by the one or more computers, the set of predicted features for the latter image in the sequential set of images using the prediction model, the first set of observed features, and the second set of observed features.

4. The computer-implemented method of claim 1, comprising:

determining, by the one or more computers, the difference between the predicted direction of travel of the object in the latter image and the latter observed direction of travel of the object in the latter image.

5. The computer-implemented method of claim 1, comprising:

obtaining sensor data from one or more sensors;

assigning respective weighting factors for the sensor data; and determining, using the respective weighting factors for the sensor data, the threshold difference between the predicted direction of travel of the object in the latter image and the latter observed direction of travel of the object in the latter image.

6. The computer-implemented method of claim 1, wherein generating the first set of observed features comprises generating a first vector of observed feature values.

7. The computer-implemented method of claim 6, wherein generating the set of predicted features for the latter image comprises:

processing the first vector of observed feature values with the prediction model to obtain an output of the prediction model, wherein the output of the prediction model comprises a vector of predicted feature values for the latter image.

8. The computer-implemented method of claim 7, wherein the difference between the set of predicted features and the latter set of observed features comprises a distance between the first vector of observed feature values and the vector of predicted feature values for the latter image.

9. The computer-implemented method of claim 1, comprising using sets of observed features for multiple sequential sets of images that are each classified as showing a normal event to train the prediction model to predict features of latter images of additional sequential sets of images.

10. The computer-implemented method of claim 1, wherein the sequential set of images comprises a plurality of consecutive image frames.

11. The computer-implemented method of claim 1, wherein the sequential set of images comprises a plurality of image frames captured at periodic time intervals.

12. A non-transitory computer-readable medium storing software comprising instructions executable by one or more computers which, upon such execution, cause the one or more computers to perform operations comprising:

obtaining, by one or more computers, a sequential set of images including one or more earlier images and a latter image captured after each of the one or more earlier images, wherein at least some of the images of the sequential set of images depict an object;

generating, by the one or more computers, a first set of observed features including a first observed position of the object in an earlier image of the one or more earlier images in the sequential set of images;

generating, by the one or more computers, a set of predicted features for the latter image using a prediction model and the first set of observed features, the set of predicted features including a predicted position of the object in the latter image;

generating, by the one or more computers, a latter set of observed features including a latter observed position of the object in the latter image;

obtaining, by the one or more computers, sensor data from one or more sensors;

assigning, by the one or more computers, respective weighting factors for the sensor data;

determining, using the respective weighting factors for the sensor data, a threshold difference between the predicted position of the object in the latter image and the latter observed position of the object in the latter image;

determining, by the one or more computers, whether a difference between the predicted position of the object in the latter image and the latter observed position of the object in the latter image satisfies the threshold difference; and using a result of the determination whether the difference between the predicted position of the object in the latter image and the latter observed position of the object in the latter image satisfies the threshold difference, selectively classifying, by the one or more computers, the sequential set of images as showing an abnormal event or as not showing an abnormal event.

13. The non-transitory computer-readable medium of claim 12, the operations comprising:

in response to classifying the sequential set of images as showing an abnormal event, performing one or more actions.

14. The non-transitory computer-readable medium of claim 12, the operations comprising:

generating, by the one or more computers, a second set of observed features including a second observed position of the object in a second earlier image of the one or more earlier images in the sequential set of images, wherein:

generating the set of predicted features for the latter image in the sequential set of images comprises generating, by the one or more computers, the set of predicted features for the latter image in the sequential set of images using the prediction model, the first set of observed features, and the second set of observed features.

15. The non-transitory computer-readable medium of claim 12, the operations comprising:

determining, by the one or more computers, a difference between the predicted position of the object in the latter image and the latter observed position of the object in the latter image, wherein determining whether the difference between the set of predicted features and the latter set of observed features satisfies one or more abnormal event criteria comprises determining whether the difference between the predicted position of the object in the latter image and the latter observed position of the object in the latter image satisfies a threshold difference.

16. The non-transitory computer-readable medium of claim 15, the operations comprising:

obtaining sensor data from one or more sensors;

assigning respective weighting factors for the sensor data; and determining, using the respective weighting factors for the sensor data, the threshold difference between the predicted position of the object in the latter image and the latter observed position of the object in the latter image.

17. The non-transitory computer-readable medium of claim 12, wherein generating the first set of observed features comprises generating a first vector of observed feature values.

18. A system, comprising:

one or more processors and one or more computer storage media storing instructions that are operable, when executed by the one or more processors, to cause the one or more processors to perform operations comprising:

obtaining, by one or more computers, a sequential set of images including one or more earlier images and a latter image captured after each of the one or more earlier images, wherein at least some of the images of the sequential set of images depict an object;

generating, by the one or more computers, a first set of observed features including a first observed direction of travel of the object in an earlier image of the one or more earlier images in the sequential set of images;

generating, by the one or more computers, a set of predicted features for the latter image using a prediction model and the first set of observed features, the set of predicted features including a predicted direction of travel of the object in the latter image;

generating, by the one or more computers, a latter set of observed features including a latter observed direction of travel of the object in the latter image;

determining, by the one or more computers, whether a difference between the predicted direction of travel of the object in the latter image and the latter observed direction of travel of the object in the latter image satisfies a threshold difference; and using a result of the determination whether the difference between the predicted direction of travel of the object in the latter image and the latter observed direction of travel of the object in the latter image satisfies the threshold difference, selectively classifying, by the one or more computers, the sequential set of images as showing an abnormal event or as not showing an abnormal event.

19. The system of claim 18, the operations comprising:

in response to classifying the sequential set of images as showing an abnormal event, performing one or more actions.

20. The system of claim 18, the operations comprising:

generating, by the one or more computers, a second set of observed features including a second observed direction of travel of the object in a second earlier image of the one or more earlier images in the sequential set of images, wherein:

generating the set of predicted features for the latter image in the sequential set of images comprises generating, by the one or more computers, the set of predicted features for the latter image in the sequential set of images using the prediction model, the first set of observed features, and the second set of observed features.

* * * * *